US007356647B1

(12) United States Patent
Andrighetti et al.

(10) Patent No.: US 7,356,647 B1
(45) Date of Patent: Apr. 8, 2008

(54) CACHE WITH INTEGRATED CAPABILITY TO WRITE OUT ENTIRE CACHE

(75) Inventors: Robert H. Andrighetti, Somerset, WI (US); Donald C. Englin, Shoreview, MN (US); Douglas A. Fuller, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 291 days.

(21) Appl. No.: 11/209,227

(22) Filed: Aug. 23, 2005

(51) Int. Cl.
*G06F 13/00* (2006.01)

(52) U.S. Cl. .................. 711/118; 711/135; 712/220; 712/229

(58) Field of Classification Search ............... None
See application file for complete search history.

(56) References Cited

U.S. PATENT DOCUMENTS 5,847,950 A * 12/1998 Bhagwat .................. 363/78
6,178,484 B1 * 1/2001 Arimilli et al. ............ 711/145
6,629,268 B1 * 9/2003 Arimilli et al. ............ 714/42
7,055,003 B2 * 5/2006 Cargnoni et al. .......... 711/135

* cited by examiner

Primary Examiner—Jasmine Song
(74) Attorney, Agent, or Firm—Charles A. Johnson; Robert Marley; Crawford Maunu PLLC (57) ABSTRACT

A cache arrangement of a data processing system provides a cache flush operation initiated by a command from a maintenance processor. The cache arrangement includes a cache memory, a mode register, and a controller. The mode register is settable by the maintenance processor to one of first and second values. The controller selectively writes all of the modified information in the cache memory to the system memory responsive to the command. Also in response to this command, all of the information is invalidated in the cache memory if the mode register is set to the second value. In one embodiment, none of the information except the modified data is invalidated if the mode register is set to the first value. The second value may be utilized to efficiently reassign one or more cache memories to a new partition.

19 Claims, 4 Drawing Sheets

CACHE WITH INTEGRATED CAPABILITY TO WRITE OUT ENTIRE CACHE

FIELD OF THE INVENTION

The present disclosure relates to caches of a data processing system.

BACKGROUND OF THE INVENTION

Many data processing systems include at least one level of cache memory. A cache memory (or "cache" for short) contains a portion of the contents of the main memory for the data processing system. A cache is generally associated with one or several processors of the data processing system, is closer to these processors than main memory, and is faster than main memory. Because the cache contains a subset of the contents of the main memory, a particular access by a processor will reference data that may or may not be present in the cache. An access by a processor to data present in the cache can be completed faster than can an access to data not present in the cache, which must be completed by the slower and more distant main memory. Thus, the cache improves processor performance by reducing access time, and the cache allows main memory to support more processors by reducing the number of accesses to main memory.

A cache may be organized into cache lines that are at least as large as the largest access type by a processor. In many implementations, when a read access by a processor accesses data that is not in the cache and no other processor in the system has a copy of the data, the cache line containing the accessed data is transferred from main memory to the cache and the data is marked "valid and exclusive" in the cache. A subsequent write access by the processor that writes data to this cache line can write the data into the cache without accessing main memory, and the written data is marked "modified" in the cache. Because the cache has limited storage, the transferring of a cache line from main memory to the cache may require displacing another cache line. If the displaced cache line is not marked "modified" then the displaced cache line can simply be discarded. Otherwise the displaced cache line marked modified is transferred from the cache to main memory to update the contents of main memory.

Certain cache operations may be needed during power-up and power-down of a data processing system. On power-up of a data processing system, a cache may initially contain indeterminate values. An initialization procedure can be used to clear the contents of the cache during power-up of the data processing system, including marking each cache line as "invalid". On power-down of a data processing system, any modified data in the cache must generally be preserved by a process that includes transferring the modified data to main memory.

A data processing system may have multiple processors that are organized into cells. Each cell may include one or more of the processors with each processor having an associated cache. The data processing system may allow independent power-up and power-down of each processor and cache within a cell. An example usage for independent power-up and power-down of a processor is to allow replacement of a processor that is determined to be defective. Generally, a maintenance processor of the data processing system controls the power-up and power-down of a processor and cache within a cell.

A data processing system may permit the cells to be partitioned into several virtual machines or "partitions." Each virtual machine within the data processing system may operate under control of an independent instance of an operating system, and the maintenance processor may be responsible for setting up the virtual machines. An application executing on a virtual machine may have a temporarily increased work load, and the data processing system may allow the virtual machine to receive an additional cell reassigned by the maintenance processor from another virtual machine to augment the processing power assigned to the application. The reassignment of the cell between virtual machines may be accomplished by the power-down of the cell followed by a power-up of a cell in the desired virtual machine. However, the reassignment of a cell between virtual machines by power-down and power-up of the cell may be time-consuming and inefficient. What is needed, therefore, is an improved system and method for reassigning a cell between virtual machines.

SUMMARY OF THE INVENTION

Various embodiments of the invention provide a cache arrangement of a data processing system that includes an instruction processor, a system memory, and a maintenance processor. The cache arrangement includes a cache memory, a mode register, and a controller. The cache memory stores information recently accessed by the instruction processor including information recently modified by the instruction processor. The mode register is settable by the maintenance processor to one of first and second values. A controller selectively writes the information in the cache memory to the system memory responsive to a command received from the maintenance processor. All of the modified information is written responsive to the command, all of the information is invalidated in the cache memory responsive to the command and the second value of the mode register. If the mode register is set to a first value, all of the information excluding the modified information bypasses invalidation responsive to the command.

Various other embodiments of the invention provide a method for controlling the operating state for an instruction processor of a data processing system. A mode register of a cache associated with the instruction processor is set to one of first and second values by a maintenance processor. A command from the maintenance processor to the cache causes all of the modified information in the cache to be written to a system memory of the data processing system. If the mode register is set to the second value, all of the information in the cache is also invalidated. If the mode register is set to the first value, only modified information is invalidated. All of the other information is not invalidated.

In another embodiment, a data processing system is provided with the capability to write out, and invalidate, the entire contents of the cache. The data processing system includes a system memory, a plurality of instruction processors, and a maintenance processor. Each instruction processor is coupled to a respective cache circuit, which is coupled to the system memory. Each cache circuit includes a cache memory that stores the information of the system memory recently accessed by the instruction processor, including information modified by the instruction processor. In response to a command received from the maintenance processor, a cache circuit writes all of the modified information to the system memory and invalidates all of the information in the cache memory.

BRIEF DESCRIPTION OF THE DRAWINGS

Other aspects and advantages of the invention will become apparent upon review of the Detailed Description and upon reference to the drawings in which.

DETAILED DESCRIPTION

Various embodiments of the invention provide a mode register for a cache of a data processing system. In a first mode as indicated by a first value stored in the mode register, a cache flush operation initiated by a maintenance processor permits efficient shut down of the cache and a processor associated with the cache. The cache flush operation writes all of the modified information in the cache to system memory to prevent loss of data, while not affecting the other information in the cache. In a second mode as indicated by a second value in the mode register, the cache flush operation permits efficient reassignment of the cache and associated processor between partitions of the data processing system. The cache flush operation flushes all of the modified information in the cache to prevent loss of data, and also invalidates all of the information in the cache. In this second mode, invalidating all of the information in the cache prevents a reassigned cache from indicating the presence of valid data that actually belongs to the previous partition.

Figure 1:
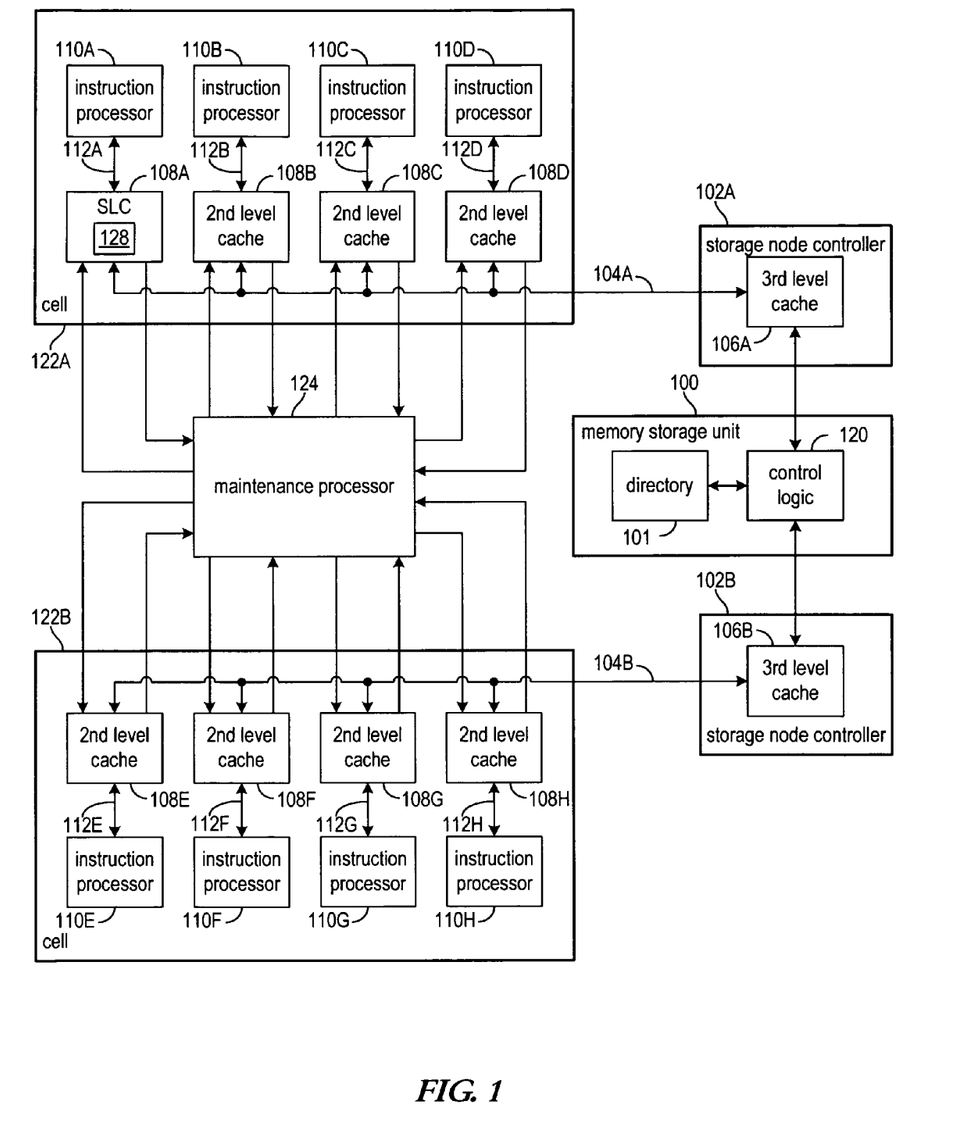
FIG. 1 is a block diagram of an example data processing system in accordance with various embodiments of the invention.

FIG. 1 is a block diagram of an example data processing system in accordance with various embodiments of the invention. The system includes a memory storage unit (MSU) 100 that provides the main memory for the system. MSU 100 may include random access memory (RAM), read-only memory (ROM), and any other type of memory known in the art. MSU 100 may be subdivided into multiple subunits (not shown) in a manner largely beyond the scope of the current invention.

In one embodiment, MSU 100 is a directory-based storage unit similar to the system described in commonly-assigned U.S. Pat. No. 6,587,931 titled "Directory Based Cache Coherency System Supporting Multiple Instruction Processor and Input/Output Caches". In this embodiment, MSU 100 retains information in directory 101 that indicates where the latest copy of requested data resides within the system. This is necessary since data from MSU 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the MSU, where a 128-byte block is referred to as a cache line. Other embodiments may utilize cache lines of different sizes.

MSU 100 is coupled to one or more Storage Node Controllers (SNCS) shown as SNCs 102A and 102B. The system of the current invention may include more or fewer SNCs than are shown in FIG. 1. Each SNC is coupled to MSU 100 over one or more high-speed MSU interfaces that each includes data, address, and function lines. For simplicity, each SNC is shown coupled to MSU 100 over a single interface. In one embodiment, a system memory is collectively provided by the MSU 100 and the SNCs 102.

Each SNC 102A or 102B includes logic to interface to the high-speed MSU interface, and further includes logic to interface to a respective one of processor buses 104A and 104B. These processor buses can be any type of bus protocol. Each SNC further includes a respective cache and all supporting logic. This cache may be a Third-Level Cache (TLC), a Fourth-Level Cache (4LC), or some other type of cache memory. In the embodiment shown, these caches are TLCs 106A and 106B.

As noted above, each of SNCs 102A and 102B is coupled to a respective processor bus 104A and 104B. Each processor bus further couples to multiple local cache memories. In the current embodiment, the local cache memories are shown as Second-Level Caches (SLCs) 108A-108H. In another embodiment, these local caches may be Third-Level Caches.

Each SLC 108 is coupled to a respective one of the Instruction Processors (IPs) 110A-110H over a respective interface 112A-112H. For example, SLC 108A is coupled to IP 110A via interface 112A, SLC 108B is coupled to IP 110B via interface 112B, and so on. The IP may be any type of processor such as a 2200™ processor commercially available from Unisys Corporation, a processor commercially available from Intel Corporation, or any other processor known in the art. Each IP may include one or more on-board caches. In the current embodiment, each IP may include a First-Level Cache (FLC). Preferably, each IP resides on a single Application Specific Integrated Circuit (ASIC) device with a respective SLC 108. Alternatively, an IP may be coupled to a respective SLC over an external interface.

When executing a stream of instructions, an IP such as IP 110A may retrieve instructions and data from MSU 100, or one of the other cache memories in the system. For example, assume IP 110A requires read/write access to a memory address. IP 110A first attempts to retrieve this address from an internal cache(s) such as a FLC. If the cache line that includes the requested address is not resident within the FLC, a request is sent to the respective SLC 108A for that cache line. If the requested cache line is likewise not resident within the SLC, the SLC forwards the request to the coupled SNC 102A via the associated processor bus 104A. In one embodiment of the invention, each SLC implements a bus snoop protocol to monitor the processor bus for such requests. When the request is "snooped" by the SLCs 108B-108D, the SLC will return the data and desired access rights to SLC 108A on processor bus 104A if such a data copy and access rights are retained by that SLC. Similarly, if TLC 106A stores the most recent copy of the cache line, and if the TLC 106A has further been granted the desired access rights to the cache line, the cache line will be returned to the SLC 108A to be forwarded to IP 110A.

In some instances, data requested by an IP is not resident within any of the cache memories associated with processor bus 104A. In that case, SNC 102A forwards the request to MSU 100. Control logic 120 in MSU 100 determines the location of the most recent copy of the cache line using information stored within directory 101, obtains the cache line from this location, and provides the cache line to SNC 102A. The SNC 102A retains the cache line in TLC 106A and returns the cache line to SLC 108A, which forwards the cache line to IP 110A. A further discussion describing an exemplary memory coherency scheme is provided in the commonly-assigned U.S. Pat. No. 6,587,931 titled "Directory Based Cache Coherency System Supporting Multiple Instruction Processor and Input/Output Caches" referenced above.

The data processing system may include cells 122A and 122B. Cell 122A may include IPs 110A-110D and SLCs 108A-108D. Similarly, cell 122B may include IPs 110E-110H and SLCs 108E-108H. A maintenance processor 124 may control the operation of the data processing system, including controlling the operating state of each IP 110. A separate scan chain for each SLC 108 may connect the SLC to the maintenance processor 124. In an embodiment wherein each IP 110 is included on a single Application Specific Integrated Circuit (ASIC) device with a respective SLC 108, the separate scan chain may allow the maintenance processor to control the operation of both the SLC 108 and the IP 110. It will be appreciated that in other embodiments, the maintenance processor may use a single scan chain to control multiple SLCs and/or IPs, or may use separate scan chains for each SLC 108 and each IP 110.

In various embodiments of the invention, each SLC 108 has a mode register 128 (shown for SLC 108A) that affects certain operations of the SLC 108 as is later discussed in detail.

Figure 2A:
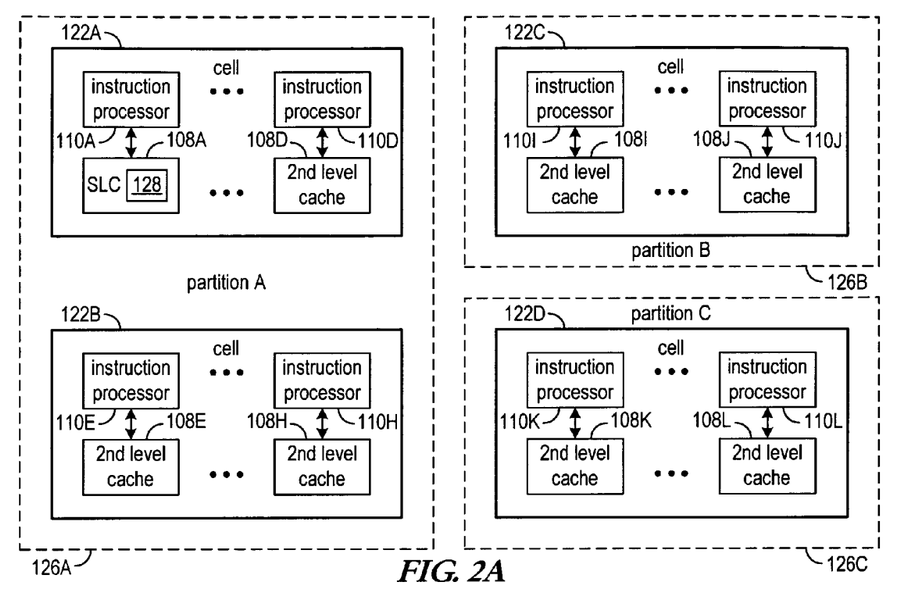
FIGS. 2A and 2B are block diagrams illustrating reassignment of a cell between partitions of a data processing system in accordance with various embodiments of the invention.
Figure 2B:
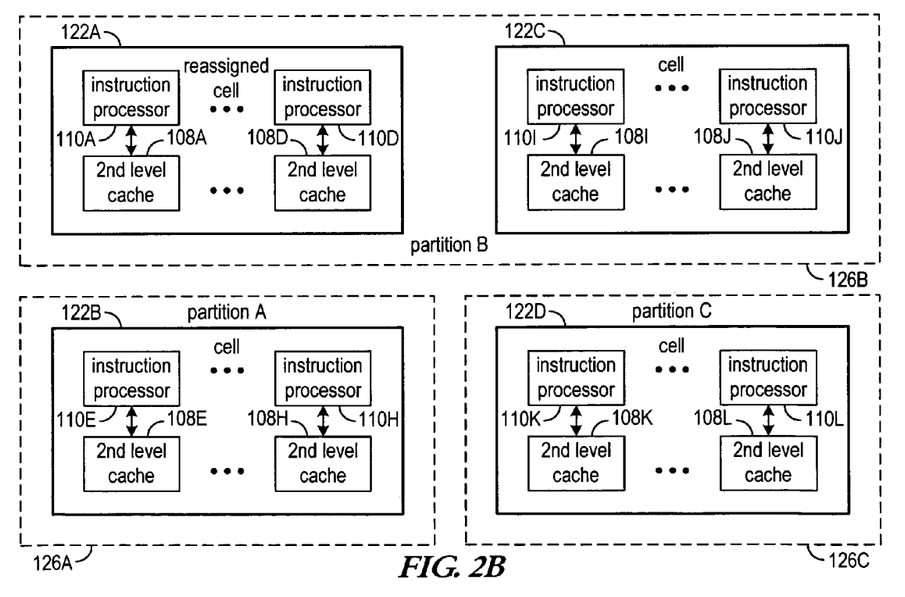

FIGS. 2A and 2B are block diagrams illustrating reassignment of a cell 122A between partitions of a data processing system in accordance with various embodiments of the invention. According to one embodiment, the physical structure of the data processing system determines the cell in which a particular IP and SLC resides. For instance, IPs 110A-110D and SLCs 108A-108D are included in cell 122A, IPs 110E-110H and SLCs 108E-108H are included in cell 122B, IPs 1101-110J and SLCs 1081-108J are included in cell 122C, and IPs 110K-110L and SLCs 108K-108L are included in cell 122D. The assignment of these cells 122A-122D to the various partitions 126A-126C is flexible, however, and may vary during the operation of the data processing system.

The partitions 126A-126C are also denoted virtual machines because each partition 126 emulates an independent data processing system. User programs executing on a partition cannot access the data or programs executing on another partition. Programmable hardware interfaces of the data processing system and/or the operating system software executing on the IPs 110 may enforce the separation of the cells 122 into partitions 126.

Initially, as shown in FIG. 2A, partition 126A includes cells 122A and 122B, partition 126B includes cell 122C, and partition 126C includes cell 122D. Cell 122A is reassigned from partition 126A to partition 126B, such that after reassignment of cell 122A as shown in FIG. 2B, partition 126A includes cell 122B, partition 126B includes cells 122A and 122C, and partition 126C still includes cell 122D.

A maintenance processor (not shown) may control the power-up of each individual IP 110 together with the respective SLC 108. Power-up of each IP 110 may include applying power to the IP and an associated SLC, initialization of the SLC, and the starting of clocks for the IP and the SLC. The maintenance processor may engage an electronic switch internal or external to the IP and/or SLC to apply power to the IP and SLC. After applying power to the SLC, the information stored in the SLC may be indeterminate. The maintenance processor may initialize the information stored in the SLC. In addition, the maintenance processor may test that certain functions of the SLC are operating correctly. For example, the maintenance processor may use serial scan to overwrite the unknown information stored in the SLC with defined values that place the SLC in a known initialization state. The serial scan operation may require that the clocks for the SLC are stopped. Thus, following initialization of the information stored in the SLC, the clocks may be safely started for the SLC and associated IP.

The maintenance processor may also control the power-down of each individual IP 110 together with the respective SLC 108. In one example, an IP 110A may be found to be defective during operation and power-down of IP 110A may allow replacement of IP 110A while the other IP 110D of cell 122A and the other cells 122B, 122C, and 122D continue operating. In another example, a user of a utility-model data processing system may be charged an hourly rate for each IP 110 currently in operation. The user may reduce the expense of operating the data processing system by powering-down one or more of the IPs 110A-110L.

Shut down of an IP 110A and SLC 108A may require that user programs executing on the IP are terminated and the data from the user and other programs is saved in system memory. The maintenance processor may direct the SLC 108A to write the modified information in SLC 108A to system memory. Information in the SLC 108A other than the modified information may not need to be saved because this unmodified information may already be stored in the system memory. In addition, a mode register 128 in each SLC 108 (shown for SLC 108A) may control whether or not the unmodified information is removed from the SLC. Invalidation of the unmodified information may not be needed before shutting down the IP 110A and SLC 108A because all information in the SLC 108A is generally destroyed during shut down by the removal of power. After completing the saving of the modified information, the maintenance processor may shut down the IP 110A and SLC 108A by stopping clocks and removing power.

Reassignment of cell 122A from partition 126A to partition 126B may be similar to a shut down of the IPs 110A-110D and SLCs 108A-108D in cell 122A. Reassignment of a cell 122A may require that user programs executing on the IPs 110A-110D be terminated and that the data from the user and other programs be saved in system memory. The maintenance processor may direct the SLCs 108A-108D in cell 122A to write modified information to system memory. However, unlike the situation described above, reassignment of cell 122A may not require interruption of power and clocks for the IPs 110A-110D and SLCs 108A-108D in cell 122A. In addition, the testing of the SLCs 108A-108D in cell 122A may be unnecessary because SLCs 108A-108D have been previously tested. Further, the initialization of SLCs 108A-108D may be unnecessary as long as each of these SLCs does not contain any data belonging to the original partition at the time it is reassigned. This latter requirement ensures that the data of one partition remains isolated from that of another partition, as is necessary to comply with security and privacy requirements, for instance. A value in mode register 128 that removes all information from each SLC 108A-108D during the writing of modified information to system memory may ensure that these SLCs are empty.

Figure 3:
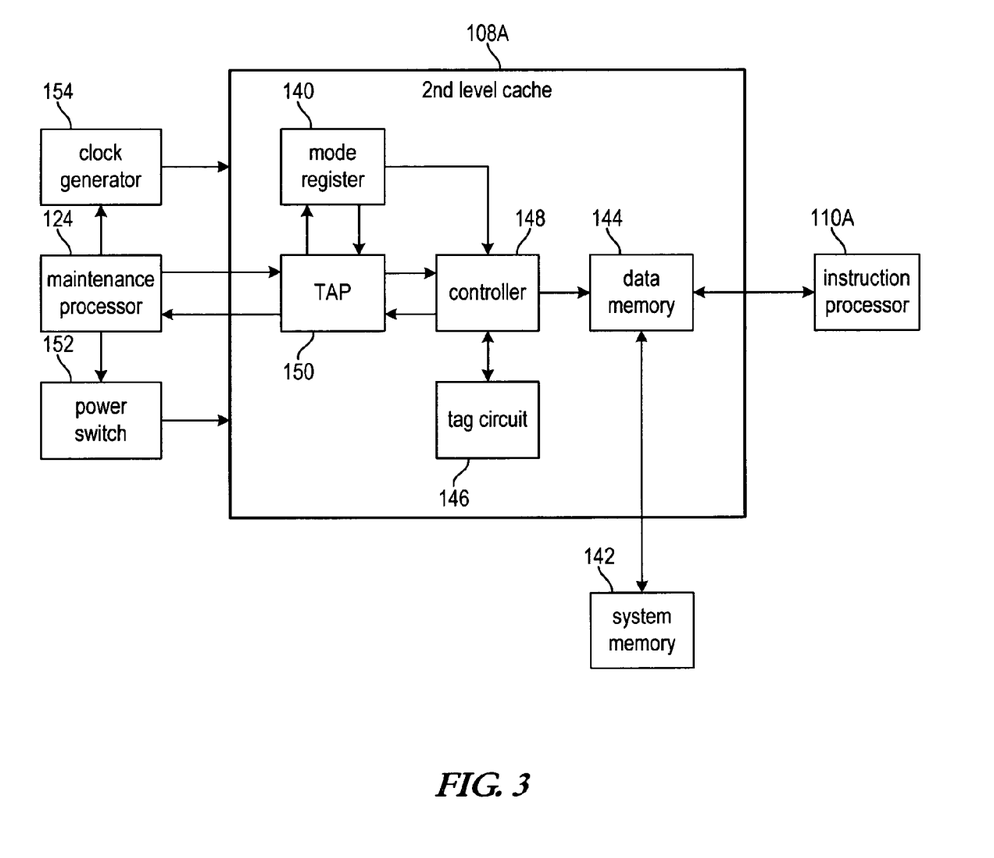
FIG. 3 is a block diagram of a cache in accordance with various embodiments of the invention.

FIG. 3 is a block diagram of a second level cache (SLC) 108A in accordance with various embodiments of the invention. A mode register 140 modifies the behavior of a cache flush operation provided by SLC 108A. A maintenance processor 124 can initiate the cache flush operation either for shut down of the SLC 108A and IP 110A, or for reassignment of the SLC 108A and IP 110A to another partition (not shown in FIG. 3). The value in mode register 140 can modify the behavior of the cache flush operation as appropriate for either shut down or reassignment of the SLC 108A and IP 110A.

During execution of programs by IP 110A, IP 110A accesses information, including instructions and data, from system memory 142. Information recently accessed by IP 110A may be stored in data memory 144 to allow fast access to this information by IP 110A. In one embodiment, data memory 144 includes data accessed by IP 110A, but does not include instructions fetched by IP 110A. In another embodiment, data memory 144 includes both data accessed by IP 110A and instructions fetched by IP 110A.

A tag circuit 146 stores tags associated with the information stored in data memory 144. Each tag may be associated with a cache line of the information in data memory 144 and the value for each tag may include one of a valid tag, a modified tag, and invalid tag. In certain embodiments, each tag may have additional values, such as an exclusive tag. A valid tag indicates the associated cache line of information is valid. In contrast, a modified tag indicates the associated cache line of information is valid and has been modified by the IP 110A. An exclusive tag indicates that SLC 108A has exclusive ownership of the associated cache line of information and that data modified by IP 110A can therefore be stored to that cache line within SLC 108A. Finally, an invalid tag indicates the associated cache line of information is invalid. The SLC 108A is considered "empty" when all tags in tag circuit 146 store an invalid tag.

A controller 148 may perform the cache flush operation when directed by a command from the maintenance processor 124. Maintenance processor 124 may be connected by a serial scan chain to a test access port 150 (TAP) in SLC 108A. TAP 150 may provide several registers, such as an instruction register and user data registers. In one embodiment, the command from the maintenance processor 124 to perform the cache flush operation may be a particular TAP instruction for the instruction register. In another embodiment, the command may be a scan operation from the maintenance processor 124 that sets a value in a user data register on a dynamic scan chain internal to SLC 108A. The mode register 140 may be a user data register or a portion of a user data register on a scan chain internal to SLC 108A.

When the IP 110A and SLC 108A is shut down by the maintenance processor 124, the maintenance processor first sets the mode register 140 to a value corresponding to the shut-down variation of the cache flush operation, and then the maintenance processor issues the command to perform the cache flush operation. In response, the controller 148 examines each of the tags in tag circuit 146. For each modified tag, controller 148 writes the associated cache line of modified information from the data memory 144 to the system memory 142. In one embodiment, the controller 148 also changes the modified tag to an invalid tag. The changing of each modified tag in this manner does not impact performance for the cache flush operation because updating of a tag may be overlapped with storing the associated modified information to system memory 142. In this embodiment, all valid cache lines that were not modified will still be indicated as being valid by tag circuit 146 after the flush operation is completed.

In another embodiment of shut-down mode, the controller 148 does not change any tag in the tag circuit 146 during the cache flush operation. After all of the modified information in the data memory 144 is written to system memory 142, any cache lines that stored modified data, as well as all cache lines that store valid data that was not modified, will be indicated as modified and valid, respectively, by tag circuit 146.

After the cache flush operation is completed in the foregoing manner, the power may be removed from the SLC 108A by the power switch 152 as directed by the maintenance processor 124. As a result, all of the information stored in the data memory 144 and the tag circuit 146 is generally lost. At a subsequent restoration of power, the maintenance processor 124 may re-initialize tag circuit 146 and data memory 144 to some predetermined initialization state via a scan interface and TAP 150 to ensure the SLC 108A is indicated as being "empty". The maintenance processor 124 may need to stop the clocks from the clock generator 154 before beginning these initialization scan operations and then restart the clocks after completing these initialization scan operations.

When the IP 110A and SLC 108A are reassigned to another partition (not shown in FIG. 3) by the maintenance processor 124, the maintenance processor first sets the mode register 140 to a value corresponding to the reassignment variation of the cache flush operation, and then the maintenance processor issues the command to perform the cache flush operation. In response, the controller 148 examines each of the tags in tag circuit 146. For each tag that stores a modified tag value, the controller 148 writes the associated cache line of modified information from the data memory 144 to the system memory 142. In addition, the controller 148 also changes each valid tag (regardless of whether the associated cache line contained modified data) to an invalid tag. Changing each tag to an invalid tag value indicates that the SLC 108A does not store any valid data (that is, the SLC is considered to be "empty") after completion of the cache flush operation.

In one embodiment, the maintenance processor 124 can set the mode register 140 and issue the command to perform the cache flush operation without previously stopping the clocks from the clock generator 154. A dynamic scan chain may be used to set the mode register 140 and issue the command without stopping clocks. A dynamic scan chain permits data to be transferred from maintenance processor 124 to and/or from SLC 108A via TAP 150 using a scan clock (not shown) that is asynchronous to the clock from clock generator 154. Circuits in the dynamic scan chain or TAP 150 then synchronize the transferred data to the clock from clock generator 154. Thus, all of the modified information in the data memory 144 may be written to system memory 142 and tags in tag circuit 146 may be changed to ensure SLC 108A is indicated as being empty without stopping clocks from clock generator 154. After completing the cache flush operation, the cell including SLC 108A and IP 110A may safely be reassigned to another partition without stopping clocks and without interrupting power from power switch 152.

Figure 4:
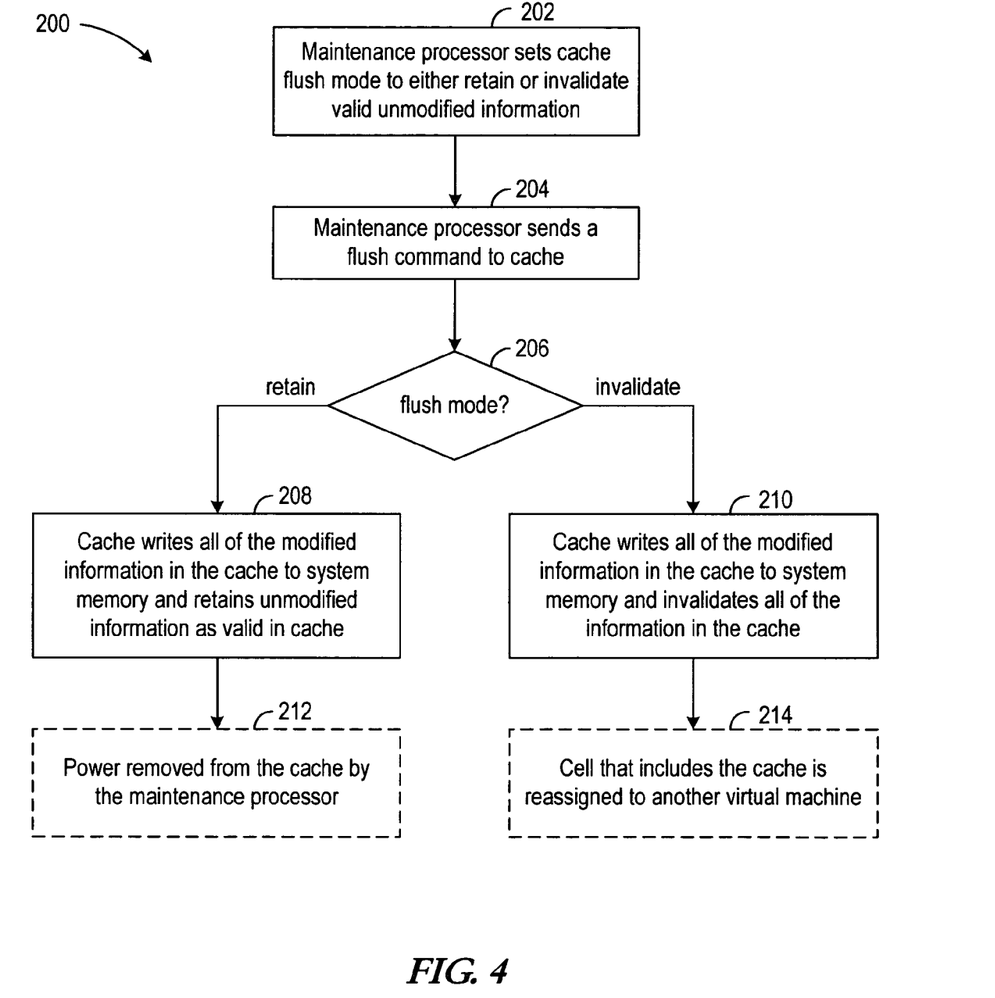
FIG. 4 is a flowchart of an example process for flushing the contents of a cache in accordance with various embodiments of the invention.

FIG. 4 is a flowchart of an example process 200 for flushing the contents of a cache in accordance with various embodiments of the invention. At step 202, a maintenance processor of a data processing system sets a mode register to a value for a cache flush mode that is either a retain mode (also referred to as shut-down mode above) or an invalidate mode. In the retain mode, information in the cache that is valid but not modified is retained during a cache flush operation. This means that after the cache flush operation is completed, those cache lines that were not modified are still indicated as being valid within the cache. In contrast, in the invalidate mode, information in the cache that is valid but not modified is invalidated during the cache flush operation.

The retain operating mode may be used to shut down the cache and associated processor and the invalidate operation mode may be used to efficiently reassign the cell including the cache to another partition.

At step 204, the maintenance processor initiates the cache flush operation by sending a command to the cache. The cache flush operation begins by checking the mode register at decision 206. For the retain mode, process 200 proceeds to step 208 and for an invalidate mode, process 200 proceeds to step 210.

At step 208 the modified information in the cache is written to a system memory. The tags for this modified information may be set to "invalid" during the flush operation, or may instead be left set to "modified". The tags for the unmodified valid information are left set to "valid", indicating this data is retained in the cache. At optional step 212, the power is removed from the cache as directed by the maintenance processor to complete a shut down of the cache and an associated processor.

Returning to step 206, if the mode register is set to an invalidate mode, processing continues to step 210 where the modified information in the cache is written to a system memory and all information in the cache, including the unmodified information, is invalidated. In one embodiment, this invalidation process need not invalidate cache lines for which the tags are already set to an "invalid" value. At optional step 214, the cell that includes the cache is reassigned to another partition.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A cache arrangement of a data processing system that includes an instruction processor, a system memory, and a maintenance processor, the cache arrangement comprising:
    a cache memory coupled to the instruction processor, wherein the cache memory stores information recently accessed by the instruction processor including information modified by the instruction processor;
    a mode register coupled to the maintenance processor, wherein the mode register stores a value from the maintenance processor; and
    a controller coupled to the maintenance processor, the cache memory, and the mode register, the controller configured to selectively write the information in the cache memory to the system memory and selectively invalidate information in the cache responsive to a command received from the maintenance processor, wherein all of the modified information is written responsive to the command, all of the information excluding the modified information bypasses invalidation responsive to the command if the mode register contains a first value, and all of the information is invalidated in the cache memory responsive to the command if the mode register contains a second value.

2. The cache arrangement of claim 1 further comprising a test access port (TAP) coupled to the mode register and the controller.

3. The cache arrangement of claim 2, wherein the controller receives the command from the maintenance processor via the TAP, and the command is one of a TAP command and a scan operation that sets a value on a scan chain coupling the TAP and the controller.

4. The cache arrangement of claim 2, wherein the mode register is on a scan chain that couples the TAP to the mode register.

5. The cache arrangement of claim 1, wherein the cache memory includes a tag circuit that stores tags associated with the information stored in the cache memory.

6. The cache arrangement of claim 5, wherein the tag circuit associates at least one modified tag with the modified information and at least one valid tag with the information excluding the modified information.

7. The cache arrangement of claim 6, wherein the controller changes each modified tag to an invalid tag responsive to the command.

8. The cache arrangement of claim 6, wherein, responsive to the command and the second value of the mode register, the controller invalidates all of the information by changing each valid tag to an invalid tag.

9. The cache arrangement of claim 6, wherein, responsive to the command and the first value of the mode register, the controller bypasses invalidation for all of the information excluding the modified information by leaving unchanged each valid tag associated with the information excluding the modified information.

10. A data processing system, comprising:
    a system memory;
    a plurality of instruction processors coupled to the system memory;
    for each instruction processor, a respective cache circuit coupled to the instruction processor and to the system memory, the respective cache circuit including a cache memory that stores the information of the system memory recently accessed by the instruction processor, including information modified by the instruction processor, wherein the respective cache circuit, responsive to a command, writes all of the modified information to the system memory and invalidates all of the information in the cache memory; and
    a maintenance processor coupled to the cache circuit, wherein the maintenance processor is configured to issue the command;
    wherein each cache circuit further includes:
        a mode register coupled to the maintenance processor, wherein the mode register stores a value from the maintenance processor; and
        a controller coupled to the maintenance processor, the cache memory, and the mode register, the controller configured to selectively write the information in the cache memory to the system memory and selectively invalidate information in the cache responsive to the command received from the maintenance processor, wherein all of the modified information is written responsive to the command, all of the information excluding the modified information bypasses invalidation responsive to the command and a first value of the mode register, and all of the information is invalidated in the cache memory responsive to the command and a second value of the mode register.

11. The data processing system of claim 10 further comprising a test access port (TAP) coupled to the mode register and the controller.

12. The data processing system of claim 11, wherein the controller receives the command from the maintenance processor via the TAP, and the command is one of a TAP command and a scan operation that sets a value on a scan chain coupling the TAP and the controller.

13. The data processing system of claim 11, wherein the mode register is on a scan chain that couples the TAP to the mode register.

14. A method for controlling the operating state for an instruction processor of a data processing system, comprising:
- setting a mode register of a cache associated with the instruction processor to one of a first and a second value by a maintenance processor, wherein the cache stores information recently accessed by the instruction processor including information modified by the instruction processor;
- sending a command from the maintenance processor to the cache;
- responsive to the command, writing all of the modified information to a system memory of the data processing system;
- responsive to the command and the second value of the mode register, invalidating all of the information in the cache; and
- responsive to the command and the first value of the mode register, bypassing invalidating all of the information other than the modified information.

15. The method of claim 14, wherein the setting of the mode register includes serially scanning a serial scan chain coupling the maintenance processor and the cache, and the sending of the command includes serially scanning the serial scan chain.

16. The method of claim 14 further comprising:
- applying power to the instruction processor and the cache by the maintenance processor;
- initializing the information in the cache by the maintenance processor; and
- starting clocks to the instruction processor and the cache by the maintenance processor.

17. The method of claim 14 further comprising removing power from the instruction processor and the cache by the maintenance processor following the setting of the mode register to the first value by the maintenance processor and the sending of the command from the maintenance processor.

18. The method of claim 14 further comprising reassigning a cell that includes the instruction processor and the cache from one virtual machine to another virtual machine by the maintenance processor.

19. The method of claim 18, wherein the reassignment of the cell follows the setting of the mode register to the second value by the maintenance processor and the sending of the command from the maintenance processor.

* * * * *